G. G. GRIM.
PIE TRIMMING AND CRIMPING MACHINE.
APPLICATION FILED JULY 23, 1913.
1,113,616.
Patented Oct. 13, 1914.
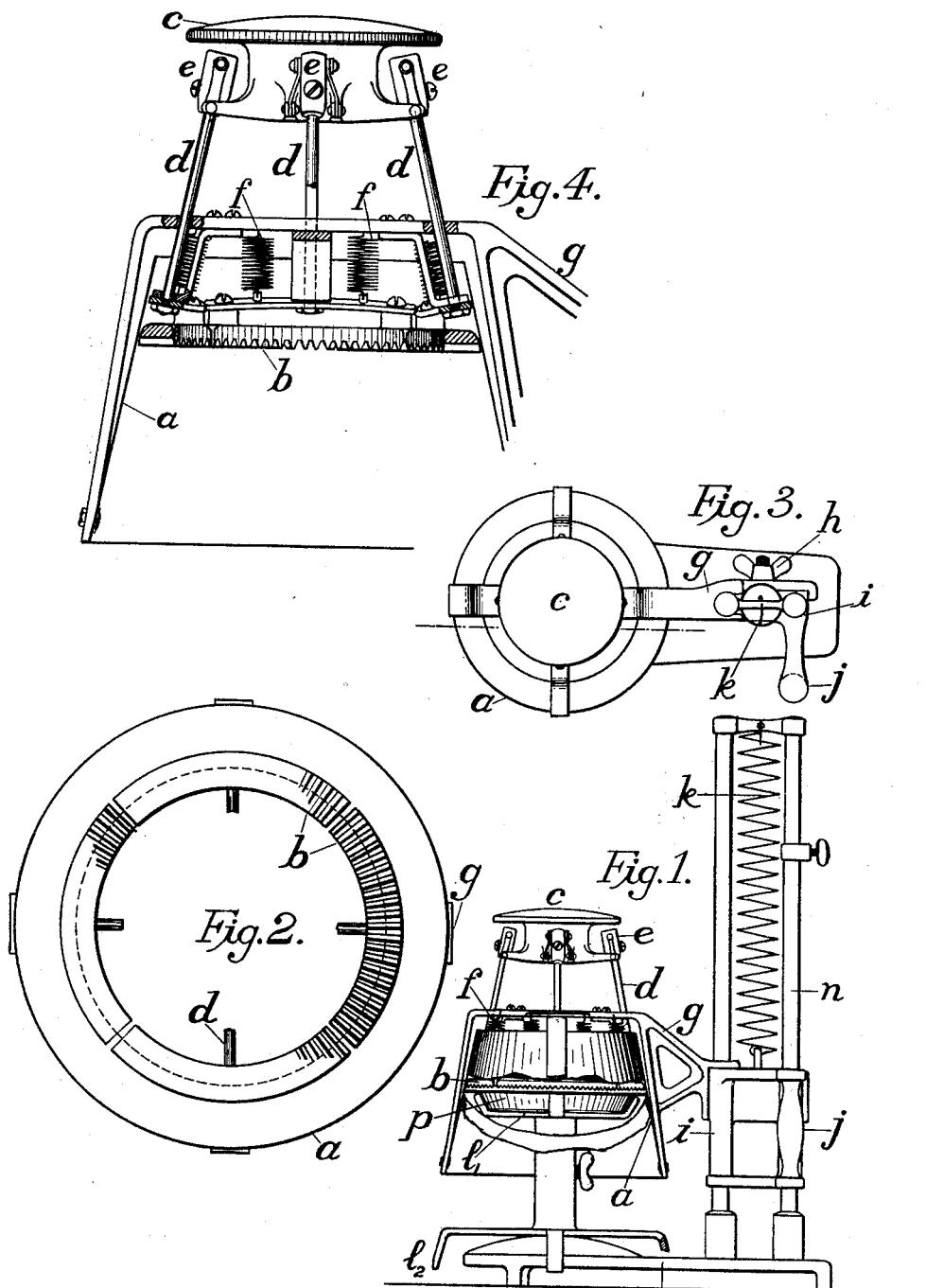

UNITED STATES PATENT OFFICE.

GEORGE G. GRIM, OF ROCHESTER, NEW YORK.

PIE TRIMMING AND CRIMPING MACHINE.

1,113,616.   Specification of Letters Patent.   Patented Oct. 13, 1914.

Application filed July 23, 1913. Serial No. 780,718.

*To all whom it may concern:*

Be it known that I, GEORGE G. GRIM, a citizen of the United States, residing at Rochester, Monroe county, New York, have invented a new and useful Pie Trimming and Crimping Machine, of which the following is a specification.

My invention has for its object to improve the construction of pie trimming and crimping machinery by affording a construction that is adapted to be successfully operated with pies of different sizes, by a mechanism that is of comparatively simple construction and can be readily operated.

A further purpose of the invention resides in the provision of a structure which enables a pie to be trimmed and crimped by two operations, the arrangement being such that it is possible to eliminate adhering or sticking of the dough to the crimping devices, as they are separated, leaving the pie in a finished state.

Still another purpose of the invention is to afford a crimping mechanism embodying a plurality of sections arranged in a manner to permit them to come in contact successively with different portions of the pie and to be separated from such portions in successive order.

To these and other ends the invention consists in certain improvements and combinations of parts all as will be hereinafter more fully described, the novel features being pointed out in the claims at the end of the specification.

In the drawings: Figure 1 is a view in side elevation of a preferred embodiment of my invention, the trimmer being broken away; Fig. 2 is a bottom plan view; Fig. 3 is a top plan view; and Fig. 4 is a side elevation partly in section.

Similar reference characters throughout the several figures indicate the same parts.

In the embodiment shown, there is provided a frame embodying a base $m$ and a pair of vertical guides $n$ upon which the trimming and crimping devices are movable. Arranged for movement on the guides $n$ is a carriage $i$, provided with a handle $j$ by which it may be operated, and controlled by a spring $k$ which acts to hold the carriage normally in raised position. Secured to the carriage $i$ is a support or casting $g$ which carries the trimming and crimping devices, and to this end is constructed with a plurality of arms extending downwardly and attached to the trimmer $a$ at the lower edge of the latter. The trimmer $a$ is preferably in the form of a truncated cone being constructed of spun aluminum or a flexible grade of tin, and is inclined slightly away from the upper portions of the arms on the casting $g$, so as to permit its upper part to have a more or less free and yielding action as it contacts with the pie tin. The trimmer may be attached to the arms of the casting by riveting or in any other suitable manner. By reason of the conical shape of the trimmer, it is possible to utilize the same machine in connection with pies of different sizes, and in operation, the trimmer is moved downwardly by depressing the carriage $i$, until its inner surface comes in contact with the dough against the edge of the pie tin, severing the dough by a downward shearing action as shown in Fig. 1.

After the trimming operation has taken place, it is desirable to crimp the dough around the edge of the tin in a manner which will prevent the dough from adhering to the crimping devices as the latter are moved away, and to this end I employ a crimper consisting of a series of independent crimping members which are actuated by separate springs. This is preferably accomplished by the structure shown, comprising a series of crimping members $b$, each of which is connected by a rod $d$ to a head $c$, the rod $d$ being guided in openings in the casting $g$ and provided with rocker-arms $e$ pivoted in suitable bearings in the head $c$. Springs $f$ connect the casting $g$ with the crimping members $b$, and serve to hold the latter normally in elevated position. After the trimming action has taken place, when it is desired to crimp the edge of the pie, the head $c$ is depressed, moving the crimpers against the action of the springs $f$, until they engage the pie. It will be observed that by reason of the independent mounting of the several crimping members, they may come into operative engagement with the pie at successive intervals and be raised in a similar order, the head $c$ partaking of a rolling motion to effect this result, and by this means it will be seen that one section of the crimper may be moved from the dough while the other sections are still in engagement, and this gradual separation prevents the dough from being pulled away from the pie. The inclination of the rods $d$ permits the crimping members to move downwardly and at the same time outwardly until they engage the upper surface of the pie, the arrangement being such as to permit successful coöperation between the crimper and trimmer for any sizes of pies for which the machine may be constructed.

The pies are supported upon a holder $1_1$, which is mounted upon a standard carrying at its opposite end another holder $1_2$, the standard being reversible to accommodate two different sizes of pies. The casting $g$ is removably supported on the carriage $i$, and held in place by a set screw and thumb nut $h$.

While I have described the invention in a particular embodiment, it is to be understood that I am not limited to the precise construction set forth, and I intend to cover by this application any modifications that may embody a conical trimmer or a sectional crimper employed separately or in combination.

I claim as my invention:

1. In a machine for trimming and crimping pies, the combination with a trimmer, of a crimper movable relatively to the trimmer, said crimper comprising a plurality of independently movable sections.

2. In a machine for trimming and crimping pies, the combination with a conical trimmer having an interior surface adapted to engage pies of different sizes, of a series of crimping members movable within the trimmer, said crimping members being independently and yieldably supported.

3. In a machine for trimming and crimping pies, the combination with a guide, of a support vertically movable on the guide, a conical trimmer attached at its lower edge to the support, the upper edge of the trimmer being free, and a crimper movable relatively to the trimmer and mounted upon the support.

4. In a machine for trimming and crimping pies, the combination with a guide, of a support vertically movable on the guide, a conical trimmer attached at its lower edge to the support, the upper edge of the trimmer being free, and a series of crimping members independently mounted upon the support and movable relatively to the trimmer.

GEORGE G. GRIM.

Witnesses:
Joseph H. Engel,
John W. Branch.

Copies of this patent may be obtained for five cents each, by addressing the "Commissioner of Patents, Washington, D. C."